Feb. 2, 1932.  M. TIBBETTS  1,843,253

MOTOR VEHICLE

Filed April 7, 1923

Inventor;
Milton Tibbetts

Patented Feb. 2, 1932

1,843,253

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed April 7, 1923. Serial No. 630,457.

This invention relates to motor vehicles and particularly to the steering mechanism thereof.

One of the objects of the invention is to provide a steering mechanism with simple mechanical means for securing the steering wheel to the steering post.

Another object of the invention is to provide a steering mechanism with a wood steering wheel secured to the steering post entirely from underneath the wheel.

Another object of the invention is to provide a steering mechanism with simple and inexpensive means for securing a wooden hubbed steering wheel to the steering post.

Other objects of the invention will appear from the following description taken in connection with the drawings, which form a part of this specification, and in which.

Figures 1, 2, 3, 4, 5:
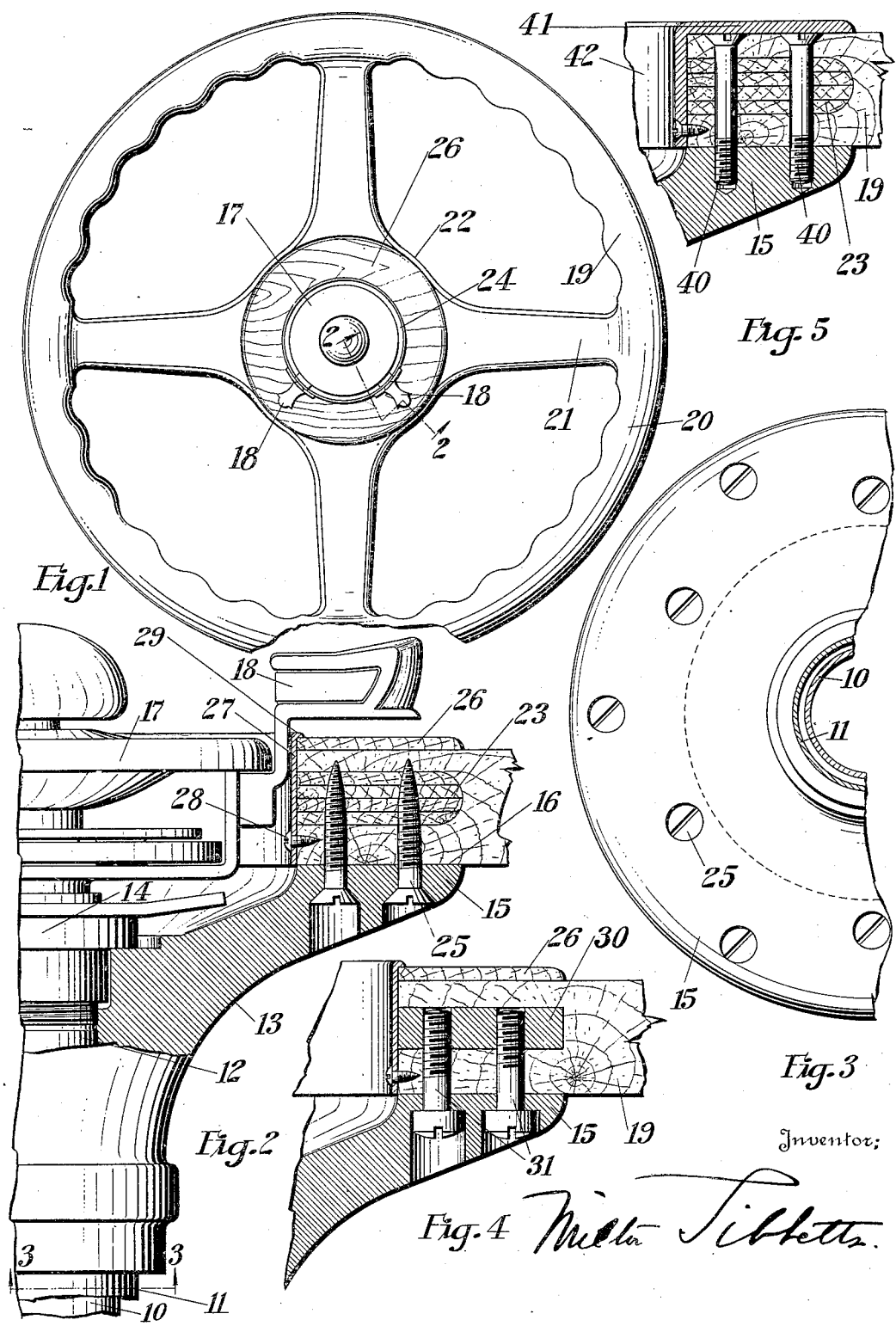
Fig. 1 is a plan view of a steering mechanism made in accordance with this invention.
Fig. 2 is an enlarged sectional view substantially on the line 2—2 of Fig. 1.
Fig. 3 is an underneath view of the steering post head, the section being taken substantially on the line 3—3 of Fig. 2.
Fig. 4 is a fragmentary section similar to that of Fig. 2, illustrating another form of the steering wheel and attaching means.
Fig. 5 is a view similar to Fig. 4 showing still another form of steering wheel and attaching means.

Referring to the drawings, 10 represents a steering post of a motor vehicle steering mechanism or steering gear. At its lower end it is adapted to be connected to suitable gearing which in turn connects with the front pivoted steering wheel of the vehicle. A stationary tube 11 usually surrounds the steering post to provide a mounting for the latter. The upper end of the steering post is indicated at 12 and to it is secured a casting 13 as by a nut 14 which is threaded on the steering post. This casting 13 forms an enlargement of the upper end of the steering post and it extends radially in the form of a circular flange 15, with an upper face 16 which is adapted to receive a steering wheel.

The steering post 10 is preferably in the form of a tube and certain of the motor control devices extend upwardly through the steering post. These control devices are indicated generally at 17 and one of their parts or handles 18 may be seen as extending laterally or radially to a point directly over the face 16 of the enlarged end of the steering post. This makes the handle 18 very accessible to the operator.

The control devices 17 may be withdrawn as a unit from the steering post but because of the connections at their lower ends this is a somewhat difficult operation and it is desirable, therefore, that the steering wheel may be mounted on the steering post and dismounted therefrom without disturbing the control devices. This is possible in the form of the invention shown herein.

A steering wheel is indicated at 19 and it is formed of a rim 20 and several spokes 21, as well as a hub 22. All of these parts are preferably made of wood and for the purpose of giving strength to the circular hub 22 a ply-wood ring 23 is inserted therein, as shown particularly in Fig. 2. The ring shown is made of four strips of wood glued together and inserted in the recess in the hub of the steering wheel.

The opening in the hub of the steering wheel is slightly larger than the housing of the control devices 17 so that a slot 24 is left through which the shank of the handle 18 may pass. In Fig. 1 two of these handles 18 are indicated. It will be seen that the handles are far enough above the face 16 of the enlarged end of the steering post to permit the hub of the steering wheel to be passed over the handles and finally between the handles and the face 16 so that the underneath face of the hub of the steering wheel rests on the face 16, as shown particularly in Fig. 2.

The steering wheel is now secured to the flanged part 15 of the upper end of the steering post by means passing from the flange to the hub of the steering wheel. As shown this means is a series of woodscrews 25 which extend nearly through the hub and in particular these screws pass directly through the ply-wood re-enforcing ring 23 so that the hub of the steering wheel is securely fastened to the steering post.

For the purpose of ornamentation and finish the steering wheel is preferably provided with a plate 26 which may be of metal or, as is shown herein, of wood, the surface of which may be highly polished to give an ornamental finish to the hub of the wheel. A ferrule 27 is secured to the inner face of the hub as by screws 28 and a flange 29 thereon secures the plate 26 in place, though, of course, this plate would probably also be firmly glued to the hub of the steering wheel.

Referring particularly to Fig. 4, the steering wheel 19 is formed with a metal ring 30 inserted in its hub and instead of the wood-screws shown in Fig. 2, the attaching means comprises a series of machine screws 31 extending through the flange 15 of the steering post into the ring 30. The other parts of the wheel may be the same as shown in Figs. 1 and 2.

Referring to Fig. 5 the steering wheel 19 may be formed the same as shown in Fig. 1, with a ply-wood inserted ring 23 or not, as strength is desired. In this case, however, the steering wheel is secured to the flange 15 of the steering post by machine screws 40 passing through the hub of the steering wheel and into threaded openings in the flange 15. By this means the steering wheel is rigidly secured to the steering post and yet it may be readily removed by removing the screws 40.

An ornamental plate 41 may be supported over the heads of the screws 40, this plate being secured by screws 42, or a wood plate similar to the other constructions may be used.

It will be understood that various forms of the invention other than those described above may be used without departing from the spirit or scope of the invention.

Having thus described my invention, what I claim and desire to secure by Letters Patent is:

1. A steering mechanism comprising a support having a face to receive the steering wheel, a steering wheel mounted on said face, a plate on the outer face of said steering wheel, and a ferrule secured within the hub of said steering wheel, said ferrule being coextensive axially of the hub.

2. In a steering mechanism, in combination, a steering post having an enlarged head, said head having a face adapted to receive a steering wheel, control devices mounted in said steering post and having a part extending radially over said face, a steering wheel having a hub adapted to be placed between said face and said control device parts, and means for securing the hub of said steering wheel to said face.

3. A steering mechanism comprising a support having an upper face, a steering wheel having a hub secured on said face, a ring plate on the outer face of the steering wheel hub, a ferrule covering the inner wall of the wheel hub and holding the plate against the hub, and means securing the ferrule to the hub.

4. A steering mechanism comprising a support having an upper ring face, a steering wheel having a hub secured upon said face, a ring plate on the outer face of the steering wheel hub, a detachable ferrule coextensive with the inner edge of the hub and overlying the inner edge of the ring plate, and removable means securing the ferrule to the hub.

5. A steering mechanism comprising a support having a face to receive the steering wheel, a steering wheel mounted on said face, a plate on the outer face of said steering wheel, and a ferrule secured within the hub of said steering wheel and having a flanged end overlying a portion of the plate.

In testimony whereof I affix my signature.

MILTON TIBBETTS.